United States Patent
Popovic

(10) Patent No.: US 8,947,219 B2
(45) Date of Patent: Feb. 3, 2015

(54) WARNING SYSTEM WITH HEADS UP DISPLAY

(75) Inventor: Zeljko Popovic, Royal Oak, MI (US)

(73) Assignee: Honda Motors Co., Ltd., Tokyo (JP)

( * ) Notice: Subject to any disclaimer, the term of this patent is extended or adjusted under 35 U.S.C. 154(b) by 359 days.

(21) Appl. No.: 13/092,266

(22) Filed: Apr. 22, 2011

(65) Prior Publication Data

US 2012/0268262 A1    Oct. 25, 2012

(51) Int. Cl.
*B60Q 1/00* (2006.01)

(52) U.S. Cl.
USPC ........... 340/438; 340/436; 340/461; 340/903; 345/7

(58) Field of Classification Search
CPC ............ B60Q 1/00; B60Q 9/008; B60Q 9/00; G02B 2027/014; G02B 2027/01
USPC ................. 340/436, 438, 461, 903, 435, 439, 340/425.5, 905; 345/7, 9; 382/103, 106
See application file for complete search history.

(56) References Cited

U.S. PATENT DOCUMENTS

| | | | |
|---|---|---|---|
| 5,983,161 A | 11/1999 | Lemelson et al. | |
| 6,198,462 B1* | 3/2001 | Daily et al. | 345/8 |
| 6,272,431 B1* | 8/2001 | Zamojdo et al. | 701/454 |
| 6,720,938 B2 | 4/2004 | Ohkawara et al. | |
| 6,882,287 B2 | 4/2005 | Schofield | |
| 7,092,007 B2 | 8/2006 | Eguchi et al. | |
| 7,312,724 B2 | 12/2007 | Saito et al. | |
| 7,382,276 B2 | 6/2008 | Boss et al. | |
| 7,561,966 B2 | 7/2009 | Nakamura et al. | |
| 7,762,683 B2* | 7/2010 | Williams | 362/244 |
| 2004/0178894 A1 | 9/2004 | Janssen | |
| 2007/0053551 A1* | 3/2007 | Kubo et al. | 382/106 |
| 2008/0158096 A1 | 7/2008 | Breed | |
| 2008/0312833 A1 | 12/2008 | Greene et al. | |
| 2009/0002193 A1 | 1/2009 | Cemper | |
| 2009/0051516 A1 | 2/2009 | Abel et al. | |
| 2009/0237269 A1* | 9/2009 | Okugi et al. | 340/901 |
| 2010/0066832 A1 | 3/2010 | Nagahara et al. | |
| 2010/0238161 A1* | 9/2010 | Varga et al. | 345/419 |
| 2010/0253539 A1* | 10/2010 | Seder et al. | 340/903 |
| 2010/0253598 A1 | 10/2010 | Szczerba et al. | |
| 2010/0289632 A1 | 11/2010 | Seder et al. | |
| 2011/0052042 A1* | 3/2011 | Ben Tzvi | 382/154 |
| 2011/0106337 A1* | 5/2011 | Patel et al. | 701/2 |

FOREIGN PATENT DOCUMENTS

| | | |
|---|---|---|
| DE | 4237987 | 5/1994 |
| JP | 4050041 | 2/1992 |

OTHER PUBLICATIONS

International Search Report and Written Opinion mailed Aug. 17, 2012 in PCT Application No. PCT/US2012/034162.
International Preliminary Report on Patentability (including Written Opinion of the ISA) mailed Oct. 31, 2013 in International Application No. PCT/US2012/034162.

\* cited by examiner

*Primary Examiner* — Hung T. Nguyen
(74) *Attorney, Agent, or Firm* — Plumsea Law Group, LLC

(57) ABSTRACT

A warning system for a motor vehicle includes a head up display. The warning system detects a remote vehicle that presents a potential hazard to a host vehicle, determines if the remote vehicle is visible to the driver and displays an image onto a combiner of the heads up display corresponding to a current location of the remote vehicle or a future location where the remote vehicle will appear on the combiner. In some cases, the combiner is a windshield or window of the motor vehicle.

27 Claims, 10 Drawing Sheets

WARNING SYSTEM WITH HEADS UP DISPLAY

BACKGROUND

The current embodiment relates to motor vehicles and in particular to a warning system for a motor vehicle with a heads up display and a related method for controlling the warning system.

SUMMARY

In one aspect, a motor vehicle includes a heads up display including a combiner and a driver monitoring device capable of detecting information related to the line of sight of a driver. The motor vehicle also includes an electronic control unit in communication with the heads up display and the driver monitoring device, where the electronic control unit includes an input port for receiving information about a remote vehicle. The electronic control unit is capable of determining a viewing location on the combiner associated with the remote vehicle and the electronic control unit is capable of determining if the remote vehicle is visible to the driver. The heads up display is configured to display an image onto the combiner at the viewing location when the remote vehicle is not visible to the driver.

In another aspect, a method of warning a driver in a motor vehicle includes receiving information from a driver monitoring device, receiving information related to a remote vehicle that presents a potential hazard to the driver and determining if the remote vehicle is visible to the driver. The method also includes determining a viewing location on a combiner in the motor vehicle and forming an image onto the viewing location of the combiner in the motor vehicle when the remote vehicle is not visible to the driver.

In another aspect, a method of warning a driver in a motor vehicle includes receiving information from a driver monitoring device, receiving information related to a remote vehicle that presents a potential hazard to the driver and determining if the remote vehicle is visible to the driver. The method also includes determining a viewing location on a combiner in the motor vehicle that corresponds to a location where the remote vehicle will appear at a later time and forming an image onto the viewing location of the combiner in the motor vehicle.

In another aspect, a method of warning a driver in a motor vehicle includes receiving information from a driver monitoring device, receiving information related to a remote vehicle, determining if the remote vehicle is visible to the driver and determining a viewing location on a combiner in the motor vehicle corresponding to the location of the remote vehicle when the remote vehicle is visible to the driver. The method also includes forming an image onto the viewing location of the combiner in the motor vehicle so that the image is superimposed over the remote vehicle.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and detailed description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
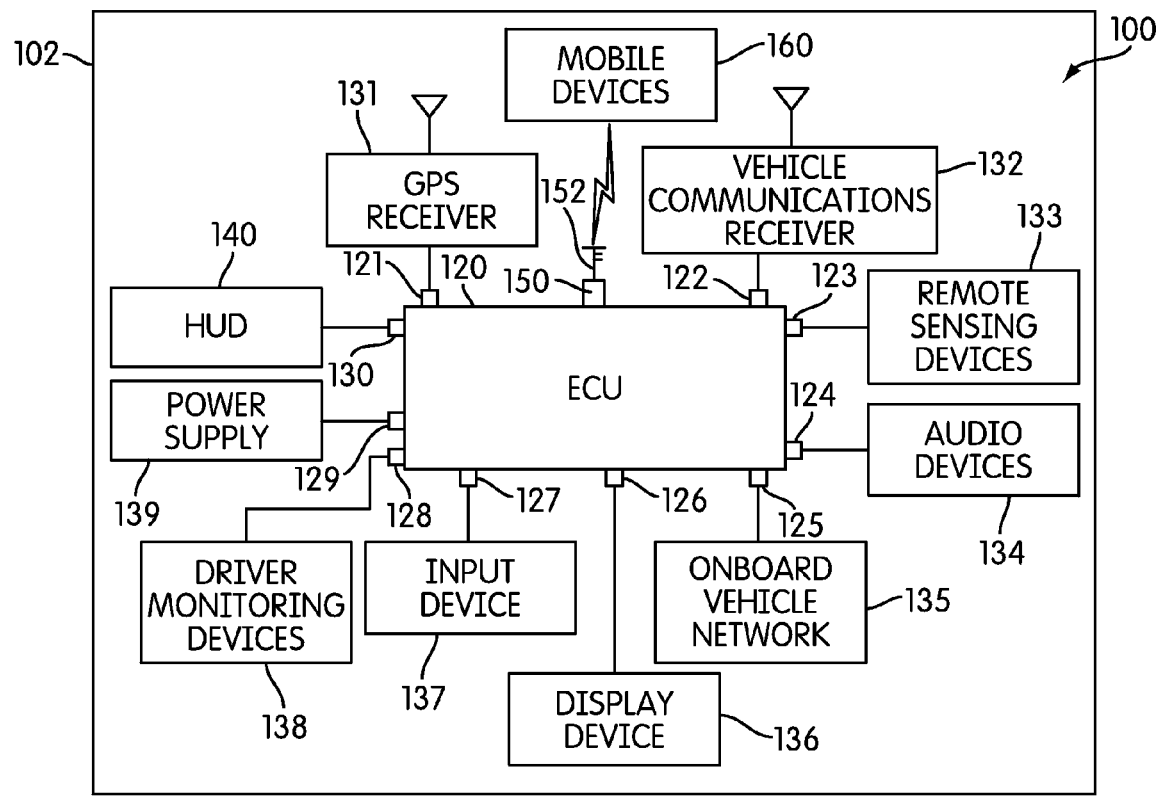
FIG. 1 is a schematic view of an embodiment of some components of a warning system for a motor vehicle.

FIG. 1 is a schematic view of an embodiment of various components for a motor vehicle 102. The term "motor vehicle" as used throughout this detailed description and in the claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, a motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

For purposes of clarity, only some components of motor vehicle 102 are shown in the current embodiment. Furthermore, it will be understood that in other embodiments some of the components may be optional. Additionally, it will be understood that in other embodiments, any other arrangements of the components illustrated here can be used for powering motor vehicle 102.

Motor vehicle 102 can include warning system 100. Warning system 100 can be any system or combination of systems used in providing warning information to a driver regarding potential driving hazards as well as other warning information. In some cases, warning system 100 can receive warning information from another device and/or system associated with motor vehicle 102. In other cases, warning system 100 can include one or more devices for gathering and/or receiving warning information. In some cases, warning system 100 can include devices or systems for gathering information, analyzing information and providing warning information to a driver, for example, through a visual alert of some kind.

In some embodiments, warning system 100 may be associated with a collision warning system, including for example, forward collision warning systems. Warnings systems may be capable of detecting a variety of hazards or threats posed by various other vehicles, objects or dangerous driving situations. Examples of various types of collision warning systems are disclosed in Mochizuki, U.S. Pat. No. 8,558,718, filed Sep. 20, 2010, the entirety of which is hereby incorporated by reference. Other examples are disclosed in Mochizuki, U.S. Pat. No. 8,587,418, filed Jul. 28, 2010, the entirety of which is hereby incorporated by reference. Still other examples are disclosed in Mochizuki, U.S. Pat. No. 8,749,365, filed Apr. 16, 2010, the entirety of which is hereby incorporated by reference. Still other examples are disclosed in Mochizuki, U.S. Pat. No. 8,618,952, filed Jan. 21, 2011, the entirety of which is hereby incorporated by reference. Still other examples are disclosed in Yester, now U.S. Patent Application No. 61/287,944, filed Dec. 18, 2009, the entirety of which is hereby incorporated by reference. It will be understood that warning system 100 is not limited to use with a particular kind of warning system and in different embodiments, the principles discussed below for displaying information for a driver in order to provide warnings or otherwise inform the driver could be applied to any type of warning system known in the art.

Referring to FIG. 1, motor vehicle 102 can include various devices. In some configurations, motor vehicle 102 can include electronic control unit 120, hereby referred to as ECU 120. In some cases, ECU 120 may include a microprocessor, RAM, ROM, and software all serving to monitor and supervise various parameters of motor vehicle 102. For example, ECU 120 is capable of receiving signals from numerous sensors located in motor vehicle 102. The output of various sensors is sent to ECU 120 where the sensor signals may be stored in an electronic storage, such as RAM. Both current and electronically stored sensor signals may be processed by a central processing unit (CPU) in accordance with software stored in an electronic memory, such as ROM.

ECU 120 can include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

The following ports and provisions associated with ECU 120 are generally optional. Some configurations may include a given port or associated provision, while others may exclude it. The following description discloses many of the possible parts and provisions that can be used; however, it should be kept in mind that not every part or provision must be used in a given configuration.

Warning system 100 can include provisions for transmitting and/or receiving information from various sources. For example, warning system 100 may include port 121 for receiving positioning or geospatial information. For example, in some cases warning system 100 may receive Global Positioning System information (GPS information). In one embodiment, warning system 100 can communicate with GPS receiver 131 through port 121. In other embodiments, however, other types of positioning or geospatial information could be received through port 121.

In some embodiments, warning system 100 can include provisions for communicating with one or more vehicles using a vehicle communication network. The term "vehicle communication network" as used throughout this detailed description and in the claims refers to any network utilizing motor vehicles and roadside units as nodes. Vehicle communication networks may be used for exchanging various types of information between motor vehicles and/or roadside units. An example of such a vehicular network is a dedicated short range communication (DSRC) network. In some cases, DSRC networks may be configured to operate in the 5.9 GHz band with bandwidth of approximately 75 MHz. Furthermore, DSRC networks may have a range of approximately 1000 m.

In some embodiments, ECU 120 may include port 122 for receiving information from a vehicle communication network. In one embodiment, for example, ECU 120 may transmit and/or receive information from vehicle communications receiver 132 through port 122. Using this configuration, warning system 100 may be configured to transmit and/or receive vehicle information over one or more vehicle communication networks.

In some embodiments, ECU 120 may include port 123 for receiving remote sensing information. The term "remote sensing information" as used throughout this detailed description and in the claims refers to any information gathered by one or more remote sensing devices. Remote sensing devices include, but are not limited to: optical devices, such as film and/or digital cameras or video cameras, radar devices, sonar devices, laser devices (such as Lidar), RFID sensing devices as well as any other devices, sensors or systems configured to receive information about one or more remote objects. In one embodiment, ECU 120 may communicate with remote sensing devices 133 using port 123. For example, in some cases, ECU 120 can receive information from a video camera related to objects in the driver's viewing area.

Warning system 100 can include provisions for communicating with one or more audio devices. In some cases, ECU 120 may include port 124 that is configured to transmit and/or receive audio information. In one embodiment, ECU 120 communicates with audio devices 134 through port 124. For example, in some cases, warning system 100 may provide audible warnings to a driver using audio devices 134. It will also be understood that in some cases, audio devices 134 could comprise one or more microphones for receiving audio information.

Warning system 100 can include provisions for communicating with a variety of different vehicle systems, components and/or devices. In one embodiment, ECU 120 includes port 125 for transmitting and/or receiving information from onboard vehicle network 135. Onboard vehicle network 135 may include any of a variety of different vehicle systems and devices including, but not limited to: engine systems, transmission systems, safety systems, braking systems, power steering systems, climate control systems, media systems, navigation systems, electronic stability control systems, collision warning systems, as well as any other kinds of vehicle systems known in the art. Moreover, ECU 120 may receive various kinds of information from onboard vehicle network 135, including, but not limited to: engine information (such as engine speed, engine temperature, fuel injection information, etc.), vehicle speed information (such as individual wheel speed or cruising speed), transmission information, braking information, navigation information as well as any other information.

In order to provide visual information to a user, ECU 120 can include a port 126 that is capable of interacting with a display device 136. To receive input from a user, ECU 120 can include port 127. Input port 127 can communicate with input device 137. In some configurations, display device 136 can also receive input from a user. In some configurations, display device 136 includes a touch screen that can receive input and in other configurations, display device 136 includes a number of buttons that can receive input. In some configurations, display device 123 includes both a touch screen and buttons. In some cases, user input received by display device 136 can also communicate with port 127.

A power port 129 can connect ECU 120 to a power supply 139. In some embodiments, power supply 139 may also be used to power one or more devices associated with ECU 120. In some cases, power supply 139 is a battery. In other embodiments any other type of power supply could be used. Moreover, in some cases, multiple power supplies could be provided.

Warning system 100 can include provisions for monitoring one or more aspects of a driver. As an example, warning system 100 may be configured to monitor the direction and location that a driver is looking, also referred to as the driver's gaze or driver's view. In some cases, ECU 120 includes port 128 for receiving driver monitoring information from one or more driver monitoring devices 138. The term "driver monitoring information" as used throughout this detailed description and in the claims includes any information about the state of a driver. In one embodiment, the driver monitoring information can include driver viewing information, including the direction of a driver's gaze, distance between eyes and viewing surface, head location and/or tilt information, driver position information, as well as other kind of monitoring information. This driver monitoring information can be used to detect where the driver is looking. In particular, the driver monitoring information can be used to determine what object (or objects) the driver is currently focusing on, as well as a viewing location on the windshield or other windows that is in the line of sight between the driver and that object.

Driver monitoring devices 138 may comprise any sensors, devices or systems for detecting driver monitoring information. In some embodiments, driver monitoring devices 138 may include but are not limited to: cameras, including film cameras, digital cameras, video cameras, charge coupled device (CCD) cameras, complementary metal-oxide-semiconductor (CMOS) cameras, other types of active pixel sensor cameras as well as any other type of cameras, thermal imaging devices, motion sensors as well as any other kinds of sensors known in the art for tracking eye movement and/or viewing direction.

Warning system 100 can include provisions for highlighting potential hazards in a driving environment. In some cases, warning system 100 may include port 130 for communicating with heads up display device 140, also referred to simply as HUD 140. Further details of HUD 140 are discussed below.

Warning system 100 can also include provisions for communicating with a mobile device, such as a mobile phone or handheld computer device. Any system can be used to facilitate this communication with a mobile device. A communication system may be wired or wireless. For example, in some cases a mobile device can be connected to ECU 120 using a physical circuit. In other cases, a mobile device can communicate with ECU 120 using a wireless system. In one embodiment, a low power radio frequency system can be used. In one embodiment, a wireless local or personal area network using the BLUETOOTH protocol can be used to facilitate communication with a mobile device. In other cases, a wireless local or personal area network can be used. In some cases, a network can be used employing any IEEE 802.15 or related protocol. In the configuration shown in FIG. 1, ECU 120 includes a local wireless network antenna port 150 that is designed to communicate with a local wireless network antenna 152, which in turn, is designed to communicate wirelessly with mobile devices 160.

Generally, any type of mobile device can be used to communicate with ECU 120. Mobile devices 160 can be any devices capable of sending and receiving electronic information and/or data wirelessly including voice information. Examples of mobile devices include, but are not limited to: cell phones, smart phones, PDA's, digital media players, portable computers (such as laptops and netbooks), tablet computers, as well as any other mobile devices that can send and/or receive information. In some cases, mobile devices 160 may be configured to send and receive data including text messages, emails, graphical information, audio information, images, and videos, as well as other types of data, such as geospatial-related data.

In some configurations, all or most of the items shown in FIG. 1 are housed in a single case or unit. In other configurations, the various items shown in FIG. 1 are not housed in a single physical case, but instead, are distributed throughout motor vehicle 102 and communicate with one another via known wired or wireless methods. For example, in a system where one or more items communicate wirelessly, the BLUETOOTH or another wireless communication protocol can be used.

Figure 2:
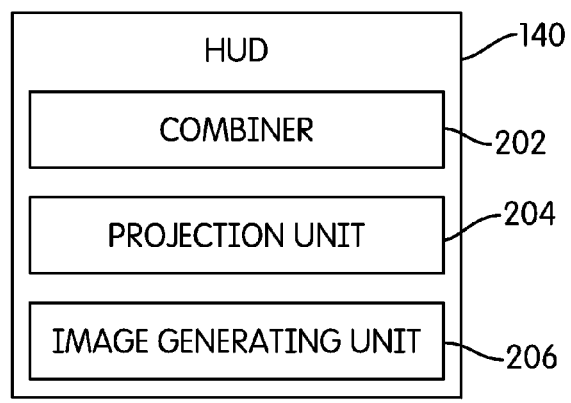
FIG. 2 is a schematic view of an embodiment of various components of a heads up display system.

FIG. 2 illustrates a schematic view of an embodiment of heads up display 140. For purposes of clarity, only some components of heads up display 140 are shown in the current embodiment. In other embodiments, additional components can be included. In still other embodiments, some components shown in FIG. 2 may be optional.

Referring to FIG. 2, HUD 140 includes combiner 202, projection unit 204 and image generating unit 206. Combiner 202 may comprise any surface for viewing both objects behind combiner 202 as well as virtual images projected onto combiner 202. In some cases, combiner 202 may be a transparent surface, such as a vehicle window or windshield. However, in other embodiments, combiner 202 could be any other viewing surface in motor vehicle 102. For example, in another embodiment, combiner 202 could comprise a video screen in the vehicle that is capable of displaying video images of the vehicle environment, such as a camera designed to show the area behind the vehicle when the vehicle is in reverse.

Combiner 202 may have any size, shape and/or geometry. In some cases, combiner 202 may be a substantially flat surface. In other cases, combiner 202 may be a substantially concave surface.

In some cases, combiner 202 may be designed to display projected images from projection unit 204. In some cases, combiner 202 comprises a coating configured to reflect predetermined wavelengths of light, which can be wavelengths used by projection unit 204 for displaying images. Moreover, other wavelengths of light are transmitted through combiner 202, so that ambient light is not reflected back to the driver. This allows the driver to see both projected images and objects behind combiner 202, such as the roadway or a preceding vehicle.

Projection unit 204 can comprise any type of projector known in the art. In some cases, projection unit 204 is a cathode ray tube projector. In other cases, projection unit 204 comprises a light emitting diode (LED) projector. In other cases, projection unit 204 is a liquid crystal display (LCD) projector. In still other cases, projection unit 204 could be any other kind of projecting device known in the art.

Image generating unit 206 may comprise one or more computing resources that are configured to generate various kinds of images. In some cases, image generating unit 206 may include a microprocessor, RAM, ROM, and software all serving to generate various images to be displayed by HUD 140. In some cases, image generating unit 206 may be capable of receiving information directly from one or more sensors or systems associated with motor vehicle 102. Both current and electronically stored sensor signals may be processed by a central processing unit (CPU) in accordance with software stored in an electronic memory, such as ROM.

The current embodiment illustrates image generating unit 206 as a separate component from ECU 120. However, in some cases it will be understood that image generating unit 206 could be integrated within ECU 120. In other words, in some embodiments, ECU 120 may comprise hardware and/or software capable of generating images that are displayed by HUD 140.

Figure 3:
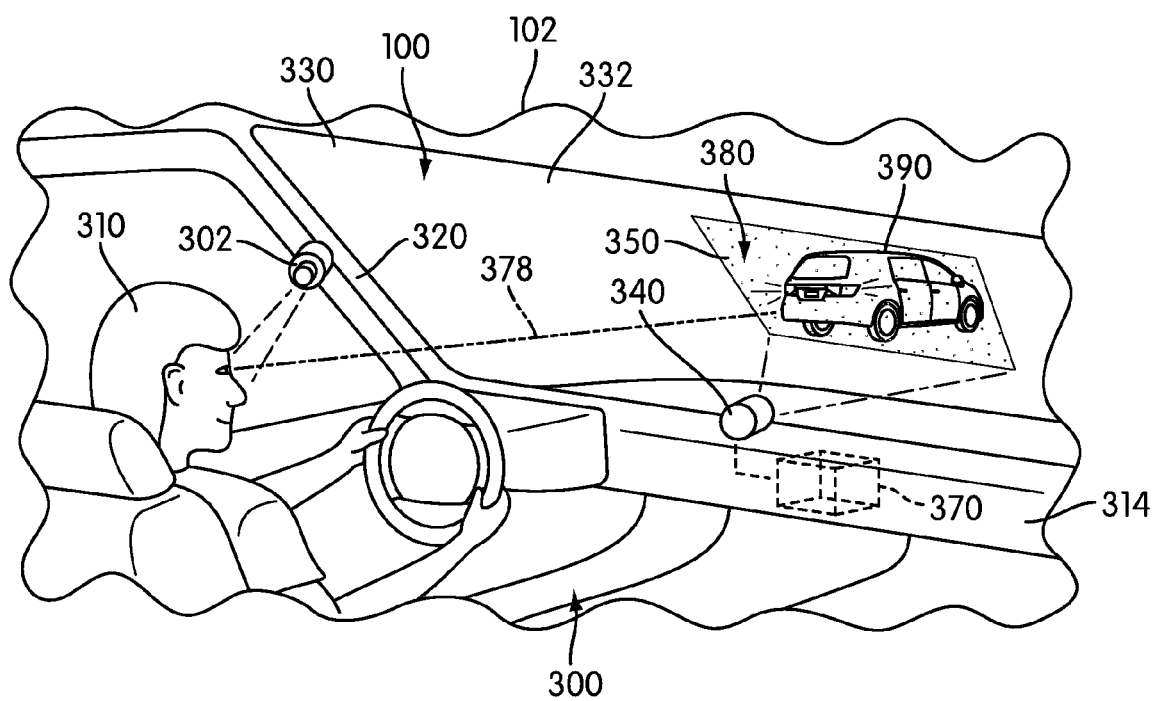
FIG. 3 is a schematic view of an embodiment of an interior portion of a motor vehicle including some components of a heads up display system.

FIG. 3 illustrates a schematic view of an embodiment of the locations of some components of warning system 100 as seen from within interior compartment 300 of motor vehicle 102. Referring to FIG. 3, driver monitoring device 302 may be a camera or other optical sensor that is configured to track the gaze or viewing direction of driver 310. In some cases, driver monitoring device 302 may also track the approximate position and/or tilt of the head of driver 310.

In this case, monitoring device 302 is mounted to frame portion 320 of motor vehicle 102. However, in other embodiments, monitoring device 302 could be located in any other portion of motor vehicle 102 including, but not limited to: a dashboard, a central console, steering wheel, steering column, a seat, rearview mirror, ceiling, visor, interior panel, door, as well as any other location within motor vehicle 102. Furthermore, in some cases, monitoring device 302 could be associated with a mobile device carried by the driver, such as a cell phone or PDA that is configured to communicate with warning system 100. For example, in one embodiment, a cell phone including a camera can be temporarily mounted to a location of interior compartment 300 so that the camera captures images of driver 310 and transmits those images to warning system 100.

In this embodiment, combiner 330 comprises some or all of windshield 332. In some cases, combiner 330 may extend to other windows within motor vehicle 102, including, for example, a driver side window and/or passenger side window. As previously discussed, combiner 330 may be treated with one or more special coatings that allow projected images to be seen clearly while allowing ambient light (or other types of light not transmitted by a projection unit) to pass through windshield 332.

Projection unit 340 is a dashboard mounted projector that displays virtual image 350 onto combiner 330. Although projection unit 340 is associated with dashboard 314 in the current embodiment, in other embodiments, projection unit 340 could be disposed in any other location of interior compartment 300. Examples of locations for projection unit 340 include, but are not limited to: a dashboard, a central console, steering wheel, steering column, a seat, rearview mirror, ceiling, visor, interior panel, door, a rearward compartment, as well as any other location within motor vehicle 102.

Projection unit 340 may receive image information from image generating unit 370. In the current embodiment, image generating unit 370 may be disposed behind dashboard 314. In other cases, however, image generating unit 370 could be disposed in any other location of a motor vehicle including, but not limited to: a dashboard, a central console, steering wheel, steering column, a seat, rearview mirror, ceiling, visor, interior panel, door, a rearward compartment, as well as any other location within motor vehicle 102. In some cases, image generating unit 370 is integrated into ECU 120 (see FIG. 1). In other cases, however, image generating unit 370 may be a stand-alone unit.

Using this configuration, driver monitoring device 302 may detect the driver's line of sight to an object behind windshield 332. For example, in the current embodiment, warning system 100 determines the general direction that driver 310 is looking. By estimating the driver's line of sight 378 according to their viewing direction, and by knowing the approximate position of the driver's eyes and combiner 330, warning system 100 may determine viewing location 380 on combiner 330. Viewing location 380 corresponds to a location of combiner 330 where driver 310 is looking in order to view preceding vehicle 390. As warning system 100 detects a potential hazard associated with preceding vehicle 390, image generating unit 370 sends an image of a red hazard box to projection unit 340. Virtual image 350, in the form of a red hazard box, is then projected by projection unit 340 onto viewing location 380 of combiner 330. This causes driver 310 perceive virtual image 350 as superimposed over preceding vehicle 390, which immediately alerts the driver to the potential hazard posed by preceding vehicle 390.

Generally, any kinds of algorithms and/or software for determining a viewing location on a combiner where a driver is looking to see an object behind the combiner can be used. Such algorithms may consider the relative positions and geometry between the driver, the combiner and the observed object. This allows a virtual image to be projected onto a precise location of the combiner (such as a windshield) so that the virtual image appears to be superimposed over the real world object (or objects) viewed by the driver. Additionally, in some cases, an image generating unit can use sensed information about the real world objects to create images that approximate the size, geometry, color, or other features of those objects in order to produce images that are clearly representative of the real world objects. In some cases, the image generating unit could also utilize stored information about various real world objects to generate images. For example, an image generating unit could retrieve stored information about a particular make and model of a vehicle to generate an image having the approximate shape and size of that particular vehicle.

FIGS. 2 and 3 illustrate possible configurations for a heads up display unit. However, it will be understood that in other embodiments, other types of heads up display units could be used. Examples of projection technologies that could be used with heads up displays include, but are not limited to: solid state projection sources, including LED, LCD and liquid crystal on silicon (LCoS) devices, digital micro-mirror (DMD) devices, organic light-emitting diode (OLED) devices and scanning laser systems. In some other embodiments, optical waveguide systems and related technologies could be used that produce images within the combiner.

A warning system utilizing a heads up display can include provisions for alerting a driver to potential hazards that may not be within view of the driver. In some cases, a warning system can display images indicating potentially hazardous objects or vehicles that a driver cannot see directly, either due to obstructions or to a limited viewing area. In some cases, a warning system may be capable of indicating the location of a hazardous object or vehicle that is behind a view obstructing object or vehicle. For example, the warning system may project a warning image onto a view obstructing object (such as a building, vehicle, pedestrian, hill, wall or other kind of obstructing object) that is between the driver and the hazardous object. In other cases, a warning system may project a warning image onto a viewing area where a potentially hazardous object will appear in the future from the driver's point of view.

Figure 4:
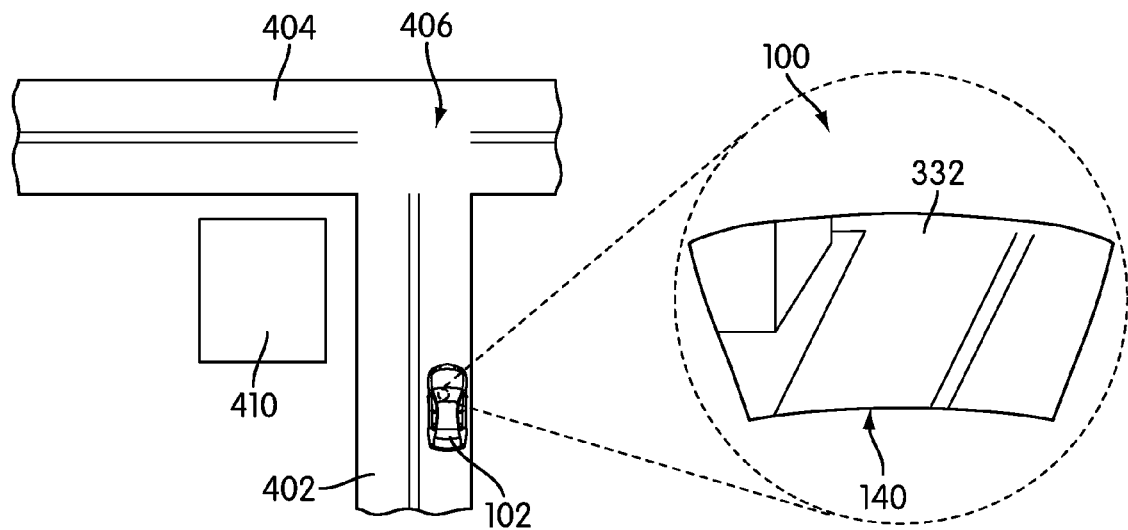
FIG. 4 is a schematic view of a situation where a motor vehicle approaches an intersection according to an embodiment of the warning system of FIG. 1.
Figure 5:
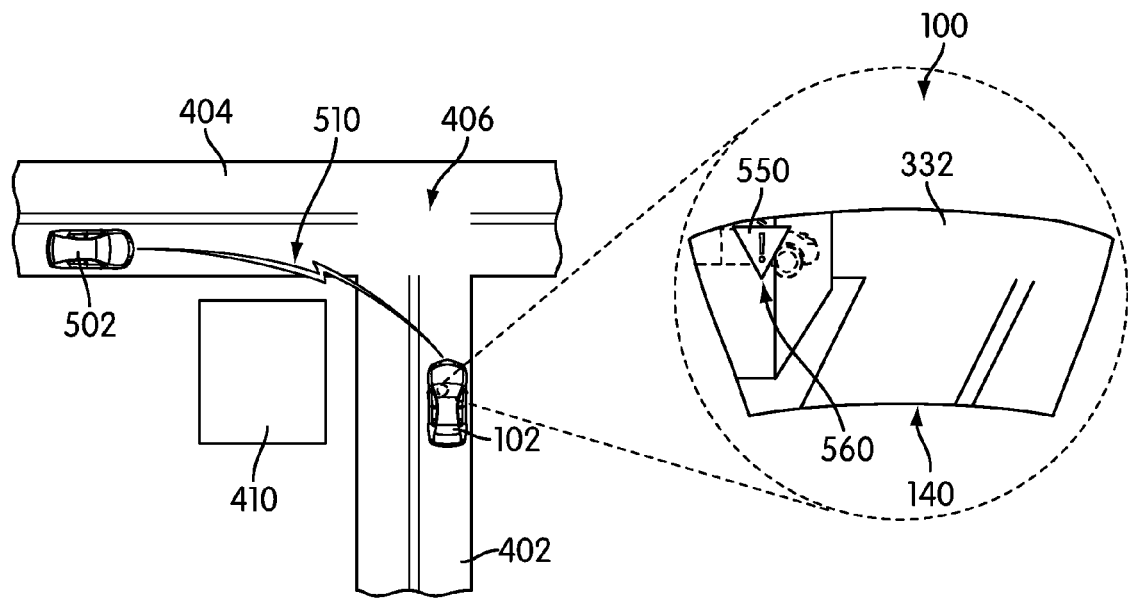
FIG. 5 is a schematic view of a situation where the motor vehicle of FIG. 4 approaches an intersection and the warning system provides a warning image on a heads up display, the warning image being superimposed over a building that obstructs the view of a remote vehicle from the driver's point of view.
Figure 6:
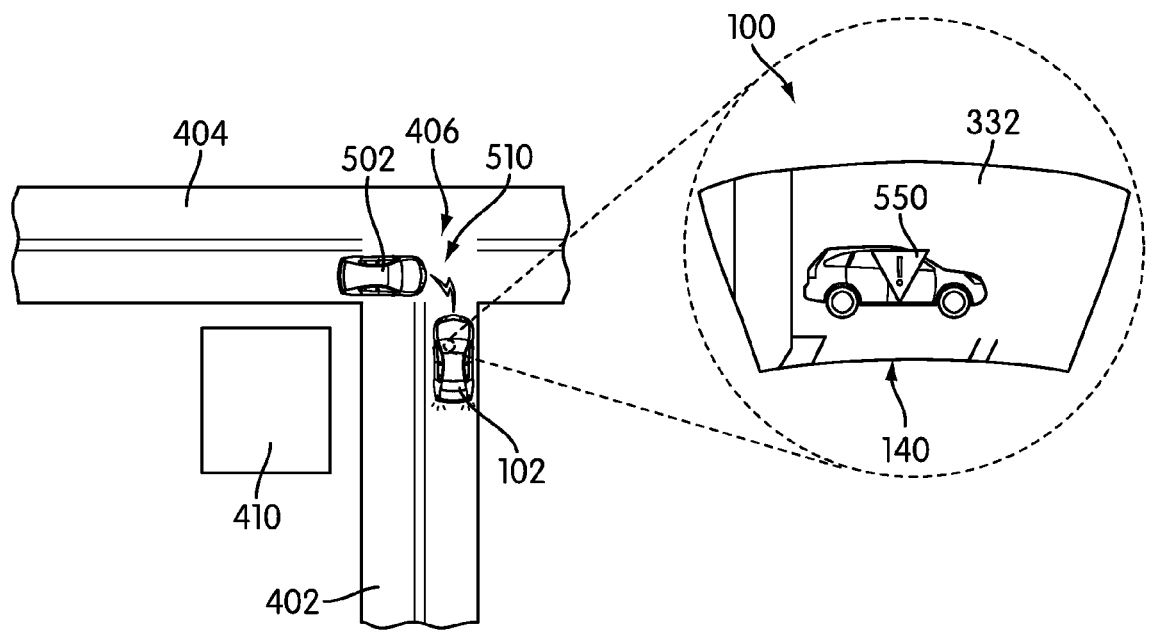
FIG. 6 is a schematic view of a situation where the motor vehicle of FIG. 4 approaches an intersection and the warning system provides a warning image on a heads up display, the warning image being superimposed over a remote vehicle from the driver's point of view.

FIGS. 4 through 6 illustrate schematic views of an exemplary situation where warning system 100 can warn a driver of a potential hazard using heads up display 140. In particular, FIGS. 4 through 6 illustrate relative positions of motor vehicle 102 and remote vehicle 502 on roadway 402 and roadway 404, respectively. Additionally, each of FIGS. 4 through 6 illustrate a schematic view of the driver's viewing area perceived through windshield 332.

Referring to FIG. 4, motor vehicle 102 is traveling on roadway 402 towards intersection 406. In this case, building 410 obstructs the driver's view of roadway 404 from the left. Referring now to FIG. 5, the driver's view of the approaching remote vehicle 502 is obstructed by building 410. However, in this embodiment motor vehicle 102 and remote vehicle 502 may be in communication through vehicle communication network 510. In particular, remote vehicle 502 may communicate position information with motor vehicle 102 so that warning system 100 is alerted to the presence of remote vehicle 502. In this situation, warning system 100 may determine that remote vehicle 502 poses a potential hazard due to the speeds at which both vehicles are approaching intersection 406. In order to alert the driver to this potential hazard posed by remote vehicle 502, warning system 100 may project warning image 550 onto windshield 332. Moreover, warning system 100 may detect the location on windshield 332 where remote vehicle 502 would be visible to the driver without the obstruction of building 410. Then, warning system 100 may project warning image 550 onto viewing location 560 that roughly corresponds to the approximate location of remote vehicle 502 behind building 410 as seen from the driver's vantage point or line of sight. As seen in FIG. 6, as remote vehicle 502 enters intersection 406, the warning provided by warning system 100 allows the driver of motor vehicle 102 to stop at the entrance to intersection 406 and thereby avoid a collision with remote vehicle 502.

Figure 7:
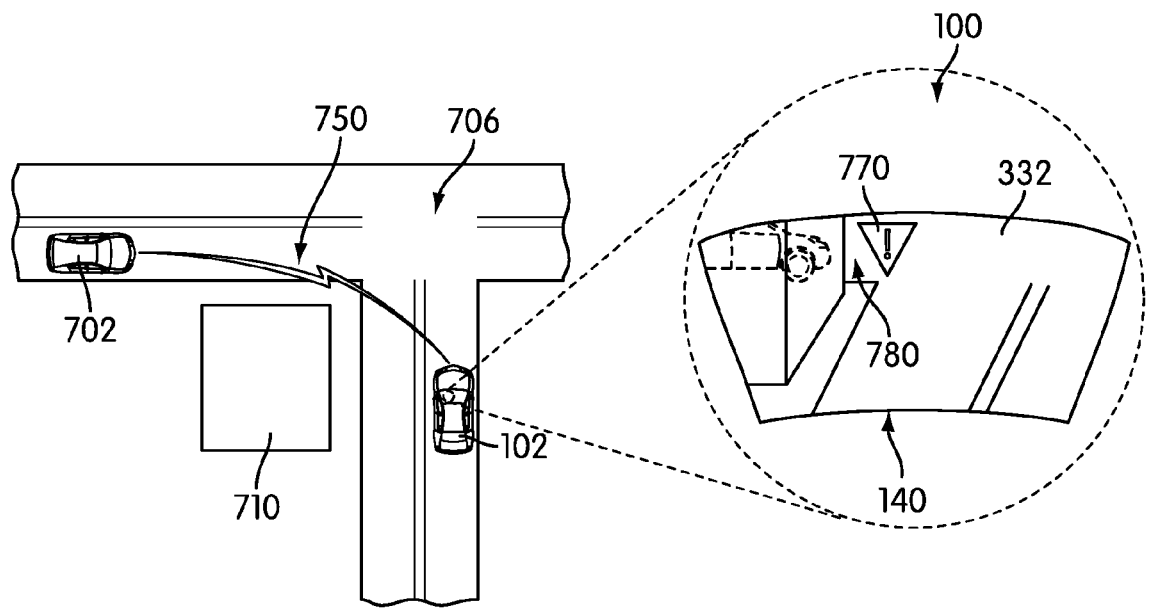
FIG. 7 is a schematic view of a situation where the motor vehicle of FIG. 4 approaches an intersection and the warning system provides a warning image on a heads up display, the warning image being superimposed over a location where a remote vehicle will appear at a future time from the driver's point of view.

FIG. 7 illustrates a schematic view of an exemplary situation where warning system 100 alerts the driver to a potential hazard by projecting a warning image onto a location of windshield 332 where a remote vehicle 702 will appear in the future from the driver's point of view. In particular, as remote vehicle 702 approaches intersection 706, the driver is unable to see remote vehicle 702 due to the presence of building 710. However, using position information, speed information and/or heading information received from remote vehicle 702 through vehicle communication network 750, warning system 100 is able to determine that remote vehicle 702 poses a potential hazard to motor vehicle 102. In order to warn the driver of this potential threat, warning system 100 may determine the viewing location on windshield 332 where remote vehicle 702 will appear in the future from the driver's point of view. In this case, warning system 100 determines that remote vehicle 702 will appear at a future time at viewing location 780 of windshield 332 from the driver's point of view. Viewing location 780 approximately corresponds to the location on windshield 332 where the driver can see the edge of building 710. This is the location where remote vehicle 702 will first be visible to the driver as both vehicles continue to approach intersection 706. In order to alert the driver, warning image 770 is projected onto viewing location 780.

In order to determine the location where a potentially hazardous object (such as a remote vehicle) will appear in the future, warning system 100 can use any algorithms and/or software. In some cases, software may be used that calculates the future trajectory of a remote vehicle (or other object) and combines this trajectory with information about environmental objects such as buildings, walls, pedestrians and/or other vehicles that may be obstructing the driver's view of the potentially hazardous vehicle. By using remotely sensed information about objects in the driver's environment, warning system 100 may estimate the location where the trajectory of the remote vehicle would be visible to the driver at a future time.

In some embodiments, a warning system could project a warning image onto one or several predetermined warning areas. For example, in some cases, if a remote vehicle is determined to pose a threat and is located to the left of a driver, but not within view of the driver, a warning image could be projected onto the left region of the windshield. This may indicate to the driver that a potential hazard is approaching from the left. Likewise, in some cases, a warning image could be projected onto the upper region, lower region, central region or right region of a windshield to indicate the approximate direction of a potentially hazardous object or vehicle.

Figure 8:
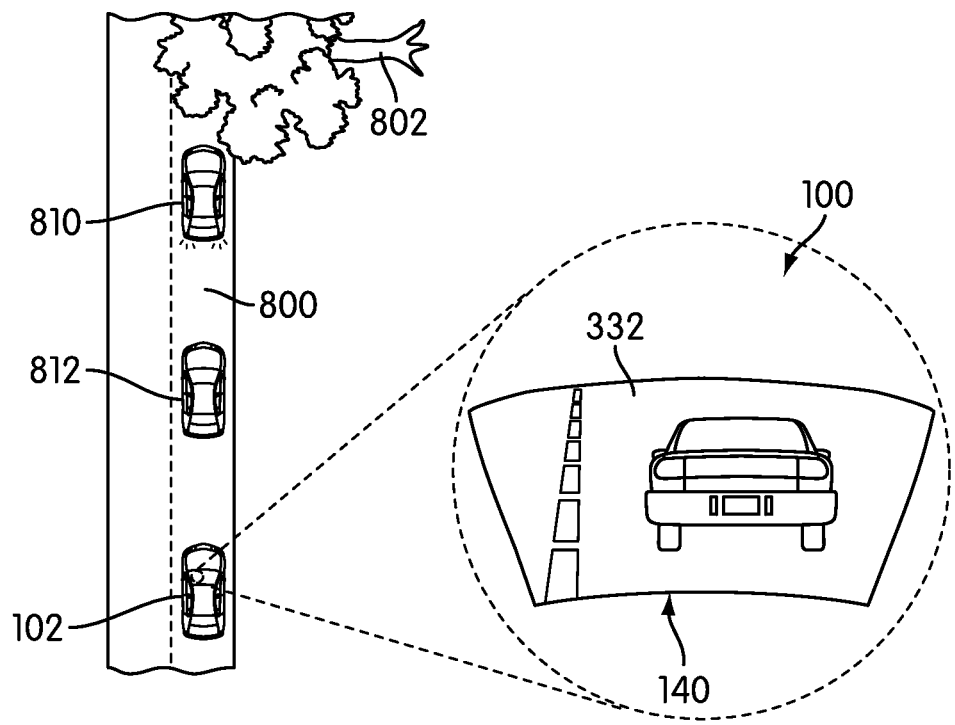
FIG. 8 is a schematic view of a situation where the motor vehicle of FIG. 1 is traveling behind two remote vehicles in which the driver's view of the first remote vehicle is obstructed by the second remote vehicle.
Figure 9:
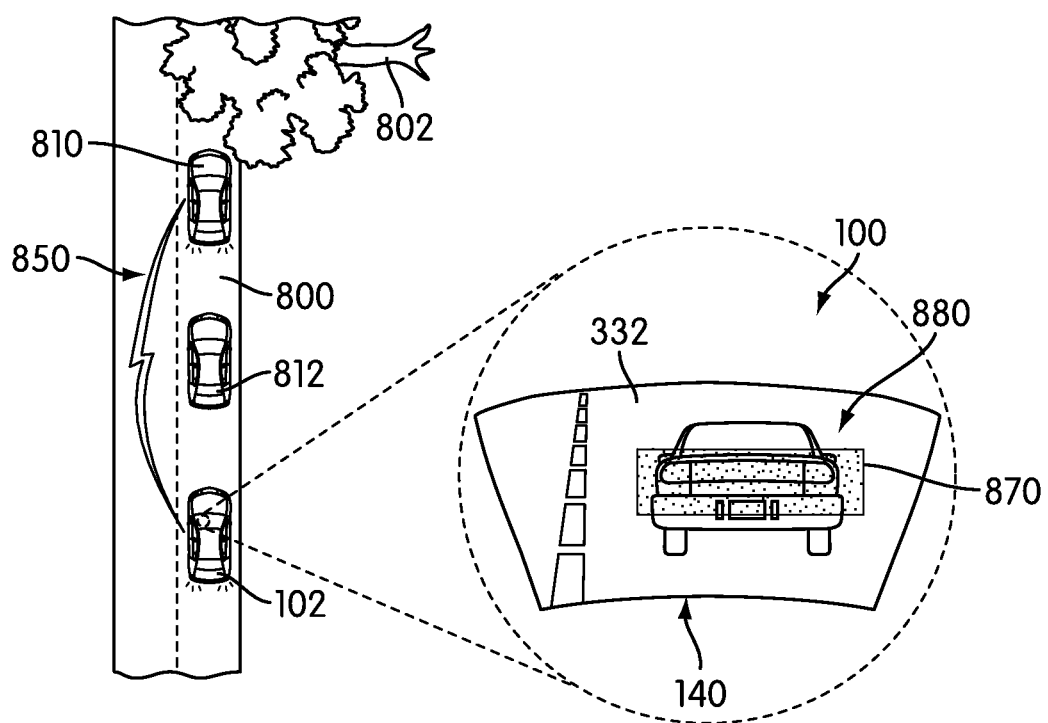
FIG. 9 is a schematic view of a situation where the warning system of FIG. 1 superimposes a warning image onto the driver's view of the second remote vehicle.

FIGS. 8 and 9 illustrate a schematic view of an exemplary situation where warning system 100 provides an alert about a potentially hazardous situation that is out of view of the driver. Referring to FIGS. 8 and 9, remote vehicle 810, remote vehicle 812 and motor vehicle 102 are traveling on roadway 800. In this situation, remote vehicle 810 breaks suddenly due to the fallen tree 802 in roadway 800. However, as seen in FIG. 8, remote vehicle 810 is not visible by the driver of motor vehicle 102 since remote vehicle 812 is obstructing the driver's view of remote vehicle 810.

Referring to FIG. 9, motor vehicle 102 may communicate with remote vehicle 810 to determine the position and/or velocity of remote vehicle 810 using vehicle communication network 850. Warning system 100 then determines that remote vehicle 810 has stopped suddenly and may pose a potential hazard. In order to alert the driver, warning box image 870 is projected onto viewing location 880 of windshield 332. From the driver's point of view, warning box image 870 is superimposed over remote vehicle 812 in order to indicate that a there is a potential hazard ahead of remote vehicle 812. In this case, the driver brakes motor vehicle 102 to slow down and avoid a potential hazard.

FIGS. 10 through 17 illustrate embodiments of various processes for operating warning system 100. In different embodiments, the various different steps of these processes may be accomplished by one or more different systems, devices or components associated with motor vehicle 102. In some embodiments, some of the steps could be accomplished by warning system 100. In some cases, some of the steps may be accomplished by ECU 120. In other embodiments, some of the steps could be accomplished by other components of a motor vehicle, including but not limited to: remote sensing devices 133, audio devices 134, various vehicle systems associated with onboard vehicle network 135, driver monitoring devices 138, heads up display 140 as well as any other systems or provisions. Additionally, in some cases, some of the steps could be accomplished by various different types of warning systems including any of the warning systems discussed throughout this detailed description and/or incorporated by reference. Moreover, for each process discussed below and illustrated in the Figures it will be understood that in some embodiments one or more of the steps could be optional. Furthermore each of these processes may refer to components or systems illustrated in FIGS. 1 and 2.

The following methods use a remote vehicle as an example of a potentially hazardous object. However, it will be understood that these methods are not restricted to use with vehicles. In other cases, a warning system may identify any other kinds of objects that may pose a potential hazard to motor vehicle 102. In some cases, these objects can be identified using remote sensing devices. In other cases, these objects can be identified through one or more forms of communication, including any type of communications network.

Figure 10:
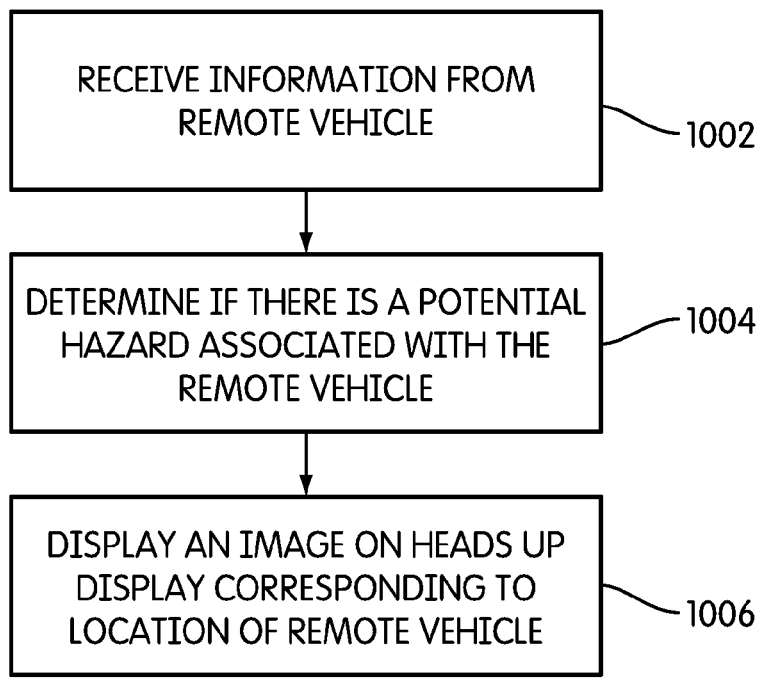
FIG. 10 is an embodiment of a process for displaying a warning image with a warning system.

FIG. 10 illustrates an embodiment of a general process for controlling a heads up display in order to warn a driver. In step 1002 warning system 100 receives information from a remote vehicle. Further details associated with step 1002 are discussed with respect to FIG. 11 below. Next, in step 1004, warning system 100 determines if there is a potential hazard associated with the remote vehicle. This can be accomplished using a variety of different methods and/or algorithms. In some cases, warning system 100 comprises one or more processes for analyzing information about remote vehicles and/or objects to determine if there is a potential hazard, such as a risk of collision between the remote vehicle and motor vehicle 102. In step 1006, if the remote vehicle poses a potential hazard, warning system 100 may display an image on heads up display 140. In some cases, the image may be a warning image that is superimposed on one or more objects in the driver's view. In cases where view of the remote vehicle is obstructed, warning system 100 may display the image over the obstructing object (such as a car, building, etc.).

Figure 11:
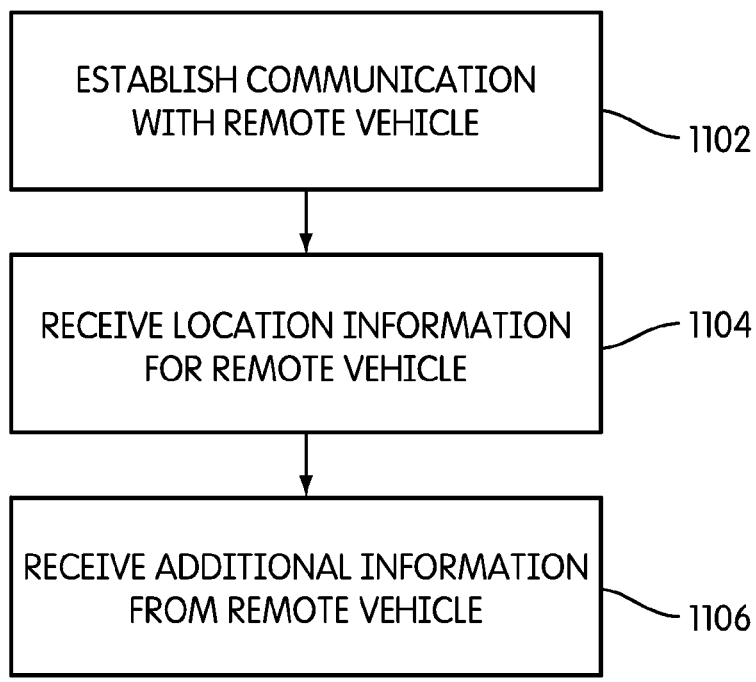
FIG. 11 is an embodiment of a process for communicating with a remote vehicle.

FIG. 11 illustrates an embodiment of a detailed method for receiving information from a remote vehicle. In some cases, these steps may be associated with step 1002 of FIG. 10. In step 1102, warning system 100 may establish communication with a remote vehicle. This could be accomplished using, for example, a vehicle communication network. In one embodiment, warning system 100 may communicate with the remote vehicle using a DSRC type communications network. Next, in step 1104, warning system 100 may receive location information for the remote vehicle. This location information could be in the form of GPS coordinates, for example. In other cases, the location information could be any other kind of absolute or relative positioning information. In some cases, during step 1104, additional information including the remote vehicle velocity, heading and/or acceleration information could also be received. In step 1106, warning system 100 may receive additional information related to the remote vehicle. For example, if a system onboard the remote vehicle identifies a potential hazard such as an accident, hazardous weather conditions or hazardous traffic conditions, this information could be transmitted by the remote vehicle. In some cases, location information as well as accident, weather, and/or traffic conditions could be received in the form of basic safety messages that may be transmitted between vehicles on a vehicle communication network. In some cases, this process could be repeated for multiple different remote vehicles and/or other remote sources. Although many remote vehicles may be in the vicinity of a motor vehicle, only some vehicles may pose potential hazards. Therefore, a collision system may be capable of monitoring multiple remote vehicles simultaneously and determining which vehicles pose threats.

Figure 12:
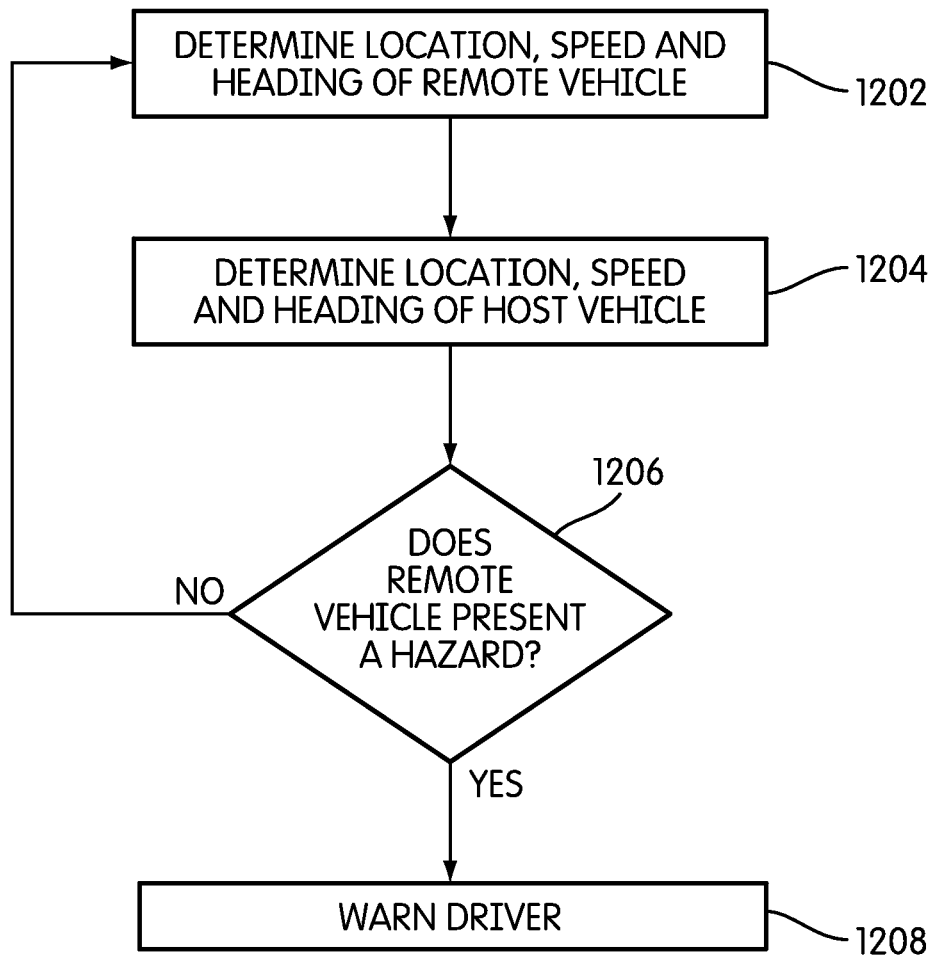
FIG. 12 is an embodiment of a process for warning a driver according to information received from a remote vehicle.

FIG. 12 illustrates an embodiment of a detailed process for determining if a remote vehicle poses a potential hazard to a host vehicle. The term "host vehicle" refers to any vehicle including a warning system. In some cases, the steps discussed in FIG. 12 may be associated with step 1004 of FIG. 10.

In step 1202, warning system 100 may determine the location, speed and heading of the remote vehicle. In some cases, warning system 100 may receive location information from a vehicle communication network. By gathering this position information over time, warning system 100 can calculate the speed and heading of the remote vehicle. In other cases, the speed and heading can also be received over a vehicle communication network. In still other cases, position information, speed information and heading information can be determined using one or more remote sensing devices. For example, a radar based remote sensing device can be used to detect the relative position of a remote vehicle with respect to a host vehicle.

Next, in step 1204, warning system 100 may determine the location, speed and heading of motor vehicle 102, also referred to as the host vehicle. In some cases, the location can be determined from GPS receiver 131. In some embodiments, speed and heading can be determined by detecting the position of the host vehicle over time. In other cases, speed and heading can be determined from one or more sensors in communication with warning system 100 through onboard vehicle network 135. For example, the speed can be determined using one or more wheel speed sensors and/or sensors associated with a transmission.

In step 1206, warning system 100 may determine if the remote vehicle presents a hazard to the host vehicle, such as a collision hazard. This can be determined using any methods for detecting possible collisions discussed above as well as any other methods for detecting various kinds of hazards known in the art. If the remote vehicle does not pose a threat, warning system 100 returns back to step 1202. Otherwise, warning system 100 proceeds to step 1208. In step 1208, warning system 100 may warn the driver. In some cases, the driver may be warned using heads up display system 140. In other cases, however, a warning could be provided using display device 136, audio devices 134 or any other devices or systems of the host vehicle. Moreover, in some cases, warnings could be provided using a combination of two or more of HUD 140, display device 136 and audio devices 134. Additionally, in some embodiments, a warning may be provided using an indicator, such as a warning light.

Figure 13:
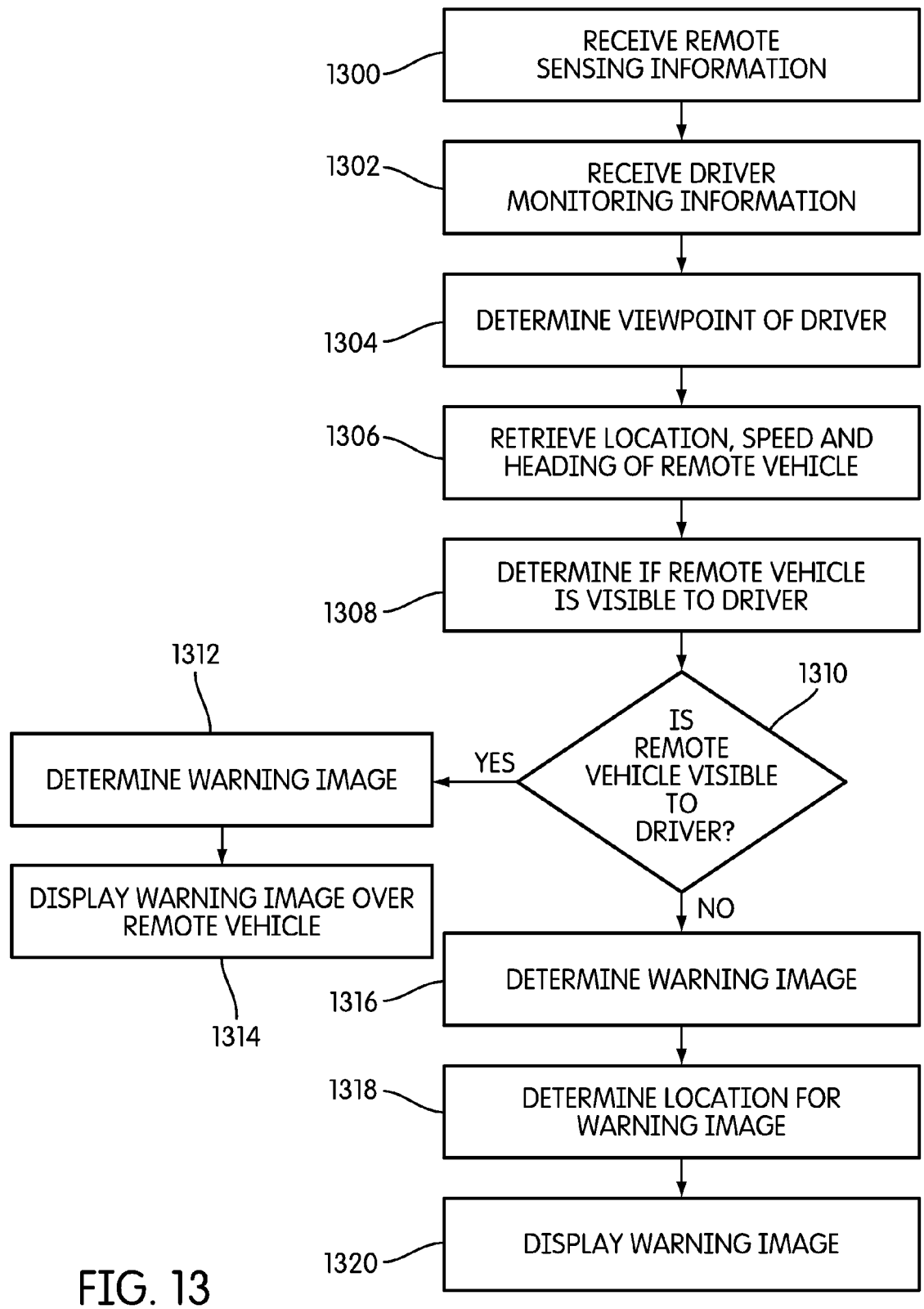
FIG. 13 is an embodiment of a process for displaying a warning image on a heads up display.

FIG. 13 illustrates an embodiment of a process for determining where to display a warning image once it has been determined that a remote vehicle poses a potential hazard. In step 1300, warning system 100 may receive remote sensing information from one or more remote sensing devices 133. This information may include information about objects in the driving environment including nearby vehicles, buildings, pedestrians and/or other objects. In some cases, cameras can be used to detect information about these objects. In other cases, other sensors could be used, such as thermal sensors, radar or other remote sensing devices 133. In step 1302, warning system 100 may receive driver monitoring information. This may include determining the driver's viewing direction, eye movements, the driver's line of sight, head position, head tilt as well as any other kind of information. Next, in step 1304, warning system 100 may determine the viewpoint of the driver. In particular, warning system 100 determines what location or region of combiner 202 (such as a windshield) the driver is currently viewing as well as what objects may be visible to the driver from that viewpoint. Next, in step 1306, warning system 100 may retrieve the location, speed, and heading of a remote vehicle. In some cases, this information may only be retrieved for remote vehicles that may pose a potential hazard as determined during previous steps. In step 1308, warning system 100 determines if the remote vehicle is visible to the driver. This may be accomplished by comparing the position of the remote vehicle with information about objects in the environment. For example, if warning system 100 detects a vehicle immediately in front of motor vehicle 102 using a camera and also determines a remote vehicle posing a potential threat is located 30 feet in front of motor vehicle 102, warning system 100 may determine that the driver cannot see the remote vehicle posing the threat. In other cases, information received over a vehicle communication network can be used to determine if a driver has line of sight to a remote vehicle.

In step 1310, warning system 100 acts on remote vehicle visibility determined in the previous step 1308. If the remote vehicle is visible, warning system 100 may proceed to step 1312 to determine a warning image. The warning image can be a predetermined warning image, or can be generated according to information about the remote vehicle. If the vehicle is detected by a camera, for example, a warning image can be generated that roughly corresponds to the size and shape of the remote vehicle as viewed by the driver. In step 1314, warning system 100 may display the warning image at a location of combiner 202 that corresponds to the driver's view of the remote vehicle so that the warning image is superimposed onto the remote vehicle.

If, during step 1310, the remote vehicle is not visible to the driver, warning system 100 may proceed to step 1316. In step 1316, warning system 100 may determine a warning image. The warning image could be a predetermined image, or could be generated according to known characteristics of the remote vehicle. For example, although the remote vehicle may not be sensed using a camera, in some cases the remote vehicle may transmit identification information of the vehicle communication network, such as the make and model of the vehicle. Using this information, warning system 100 could generate an image that schematically indicates the general type of vehicle that poses a potential threat. For example, in cases where the remote vehicle is a tractor trailer, a large truck warning image could be generated and displayed onto the windshield using HUD 140. Next, in step 1318, warning system 100 may determine a location for the warning image. In some cases, the location for the warning image may be selected so that the warning image tracks the approximate real-time location of the remote vehicle, which is hidden from view by an obstructing object. In other cases, the warning image appears in a location corresponding to the future location of the remote vehicle. For example, if a vehicle is over a hill and not visible to the driver, warning system 100 could display a warning image at the top of the hill corresponding to the general area where the remote vehicle will first become visible to the driver at a later time. Finally, in step 1320, the warning image may be displayed in the location of the windshield selected during step 1318.

Figure 14:
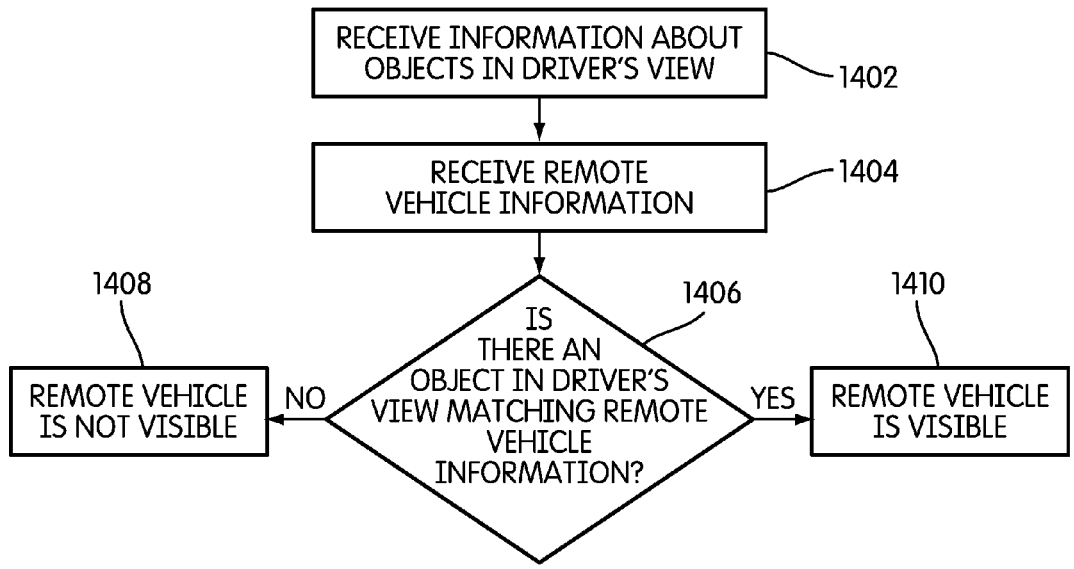
FIG. 14 is an embodiment of a process for determining if a remote vehicle is visible to a driver.

FIG. 14 illustrates an embodiment of a process for determining if a remote vehicle is visible to a driver. In step 1402, warning system 100 receives information about objects in the driver's view, including vehicles, buildings, pedestrians or other objects. This information can be obtained from remote sensing devices 133. In step 1404, warning system 100 may receive remote vehicle information. This information can be obtained from a vehicle communication network or from remote sensing devices 133.

In step 1406, warning system 100 determines if there is an object in the driver's view matching the remote vehicle information. For example, if there is an object detected to be 5 feet in front of motor vehicle 102 and the position of the remote vehicle is also known to be 5 feet in front of motor vehicle 102, warning system 100 may determine that the sensed object is the remote vehicle. In other cases, warning system 100 may analyze the approximate size and shape of the object to determine if it may be the remote vehicle. If warning system 100 determines that the object in the driver's view matches the remote vehicle information, warning system 100 determines that the remote vehicle is visible in step 1410. Otherwise, warning system 100 determines that the remote vehicle is not visible in step 1408.

Figure 15:
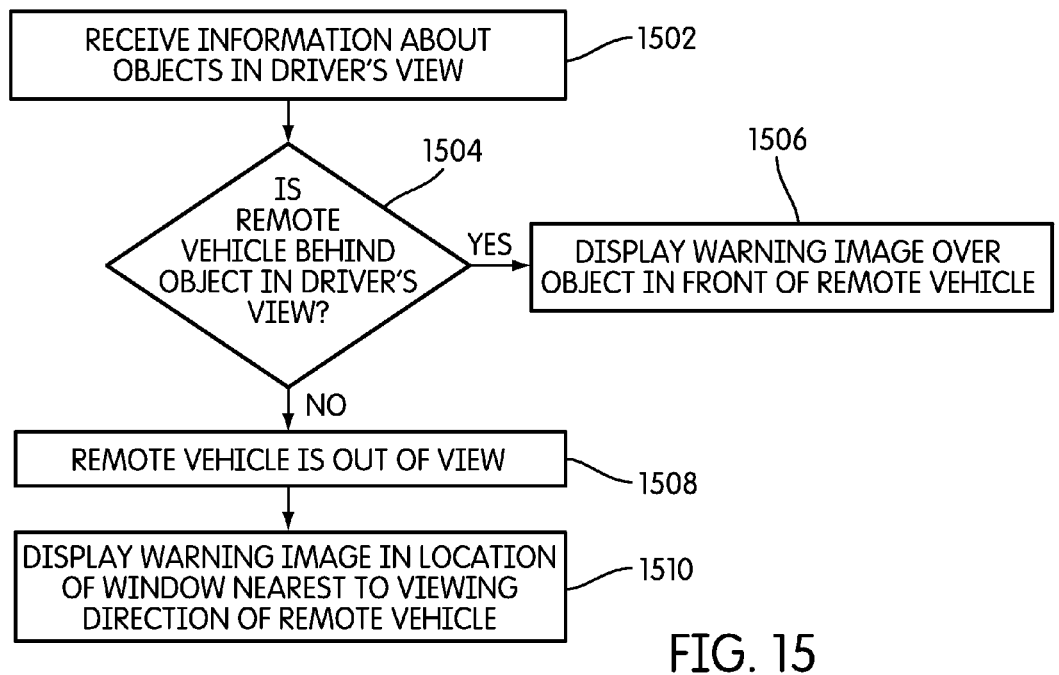
FIG. 15 is an embodiment of a process for determining where to display a warning image when a remote vehicle is out of view of the driver.

FIG. 15 illustrates an embodiment of a process for determining where to project a warning image on a heads up display for a remote vehicle that is not visible to a driver. In some cases, some of these steps may be associated with step 1318 in FIG. 13. In step 1502, warning system 100 receives information about objects in the driver's view. This information can be determined using one or more remote sensing devices 133. In step 1504, warning system 100 determines if the remote vehicle is behind an object in the driver's view. If so, warning system 100 may display a warning image over the object in front of the remote vehicle in step 1506. If not, warning system 100 may determine that the remote vehicle is out of view of the driver in step 1508. In step 1510, warning system 100 displays a warning image in a location that is nearest to the direction of the remote vehicle. For example, if the remote vehicle is far off to the left of the driver's view, warning system 100 may display a warning image on the far left side of the windshield to indicate a potential hazard off to the driver's left. Likewise, if the remote vehicle is far in front of the driver and out of view, warning system 100 may display a warning image in the center of the windshield to indicate that a potential hazard is far ahead of the driver.

Although some embodiments may use remote sensing devices to determine if a remote vehicle is within sight of a driver, other methods for determining if a remote vehicle is visible using information received over a vehicle communication network could also be used.

Figure 16:
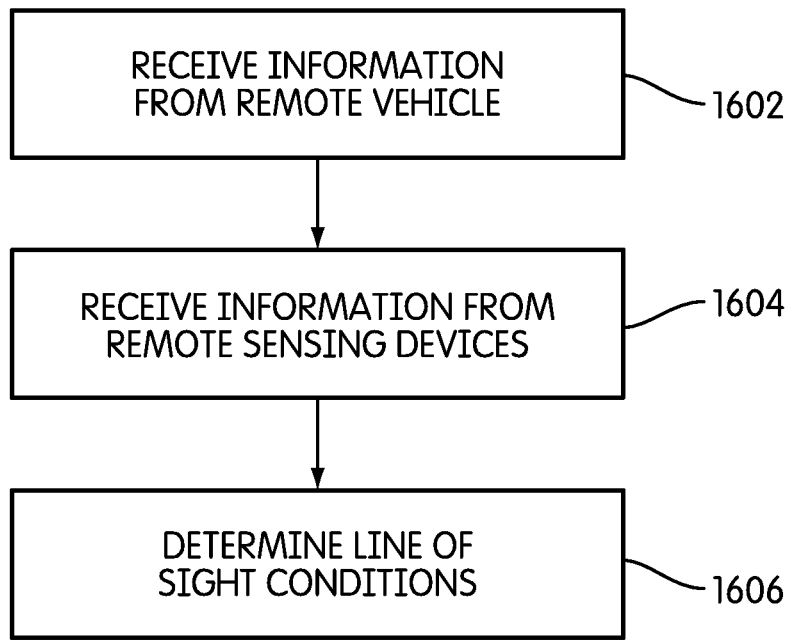
FIG. 16 is an embodiment of a process for determining line of sight conditions between the driver and a remote vehicle.

FIG. 16 illustrates an embodiment of a process for determining line of sight conditions of a remote vehicle. In step 1602, warning system 100 receives information from a remote vehicle. In step 1604, warning system 100 may receive information from one or more remote sensing devices. In step 1606, warning system 100 may determine line of sight conditions. In particular, warning system 100 determines if the driver has line of sight of the remote vehicle. Various different methods for determining line of sight of an object or vehicle are disclosed in Mochizuki, U.S. Pat. No. 8,558,718, filed Sep. 20, 2010 and Mochizuki, U.S. Pat. No. 8,749,365, filed Apr. 16, 2010, the entirety of both being hereby incorporated by reference.

Figure 17:
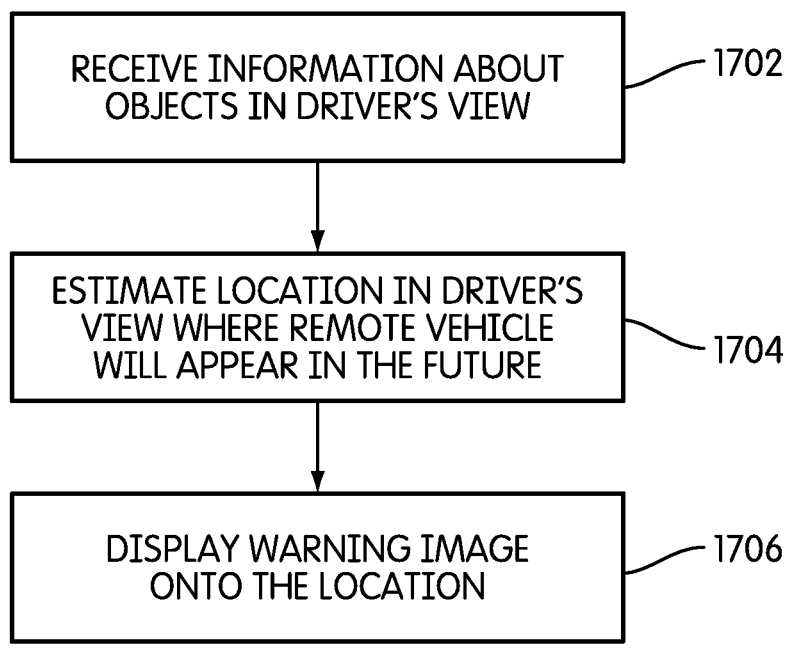
FIG. 17 is an embodiment of a process for displaying a warning image at a location corresponding to the location where a remote vehicle will appear in the future from the driver's point of view.

FIG. 17 illustrates an embodiment of a method for displaying a warning image in location where the remote vehicle will be visible in the future. In step 1702, warning system 100 may receive information about objects in the driver's view. In step 1704, warning system 100 may estimate the location in the driver's view where the remote vehicle will appear in the future. In some cases, this location could be estimated by analyzing objects in the driver's view that may be obscuring the view of the remote vehicle. Moreover, if the trajectory of the remote vehicle is determined, warning system 100 could determine a location where the remote vehicle may become visible to the driver. For example, referring back to FIG. 7, warning system 100 displays warning image 770 at a location where the driver will first see remote vehicle 702 appear from behind building 710. In some cases, this could be accomplished by determining a trajectory of remote vehicle 702 and estimating a location along that trajectory where remote vehicle 702 may be visible to the driver after remote vehicle 702 has emerged from behind building 710. Next, in step 1706, warning system 100 may display a warning image onto the location determined in step 1704. This arrangement provides warnings for a driver on a heads up display indicating potential hazards due to remote vehicles or other objects that are not in the driver's view.

While various embodiments have been described, the description is intended to be exemplary, rather than limiting and it will be apparent to those of ordinary skill in the art that many more embodiments and implementations are possible. Accordingly, the embodiments are not to be restricted except in light of the attached claims and their equivalents. Also, various modifications and changes may be made within the scope of the attached claims.

What is claimed is:

1. A motor vehicle, comprising:
a heads up display including a combiner;
a driver monitoring device configured to detect information related to a line of sight of a driver;
a remote sensing device configured to detect information related to objects in a driving environment;
an electronic control unit in communication with the heads up display, the driver monitoring device, and the remote sensing device, the electronic control unit further including an input port for receiving information related to a position of a remote vehicle;
a vehicle communications receiver configured to receive the information related to a position of the remote vehicle from the remote vehicle via a vehicle communications network, and the vehicle communications receiver is configured to output the information received from the remote vehicle to the electronic control unit through the input port;
wherein the electronic control unit is configured to determine a viewing location on the combiner that corresponds to an approximate location of the remote vehicle on the combiner as viewed from the line of sight of the driver and wherein the electronic control unit is configured to determine if the remote vehicle is visible to the driver by comparing the received information related to the position of the remote vehicle with the detected information related to objects in the driving environment, while using the information related to the line of sight of a driver;
wherein the heads up display is configured to display an image onto the combiner at the viewing location when the remote vehicle is not visible to the driver.

2. The motor vehicle according to claim 1, wherein the vehicle communications receiver is configured to receive identification information from the remote vehicle associated with a make and model of the remote vehicle, and the image displayed by the heads up display indicates a type of vehicle associated with the remote vehicle based on the identification information.

3. The motor vehicle according to claim 1, wherein the vehicle communications network is a dedicated short range communication network operating in the 5.9 GHz band with bandwidth of about 75 MHz.

4. The motor vehicle according to claim 1, wherein the image displayed by the heads up display is a warning image.

5. The motor vehicle according to claim 1, wherein the combiner is a window of the motor vehicle.

6. The motor vehicle according to claim 1, wherein the combiner is a windshield of the motor vehicle.

7. The motor vehicle according to claim 1, wherein the remote sensing device is at least one of: optical devices, radar devices, sonar devices, laser devices, and RFID sensing devices.

8. A method of warning a driver in a motor vehicle, comprising:
receiving information from a driver monitoring device;
receiving information related to a remote vehicle that presents a potential hazard to the driver, wherein the information is received from the remote vehicle via a vehicle communication network;
receiving information related to objects in a driving environment;
determining if the remote vehicle is visible to the driver by comparing the information related to the remote vehicle with the information related to objects in the driving environment;
determining a viewing location on a combiner in the motor vehicle, wherein the viewing location is in a line of sight of the driver between the driver and the remote vehicle by an electronic control unit; and
forming an image onto the viewing location of the combiner in the motor vehicle when the remote vehicle is not visible to the driver.

9. The method according to claim 8, wherein the information related to the remote vehicle includes identification information associated with a make and model of the remote vehicle and the step of forming an image onto the viewing location of the combiner includes forming an image that indicates a type of vehicle associated with the remote vehicle based on the identification information.

10. The method according to claim 8, wherein the information related to the motor vehicle is position information.

11. The method according to claim 8, wherein the driver monitoring device is configured to determine the viewing direction of the driver.

12. The method according to claim 8, wherein determining the viewing location on the combiner includes selecting a viewing location of the combiner where the driver sees an object obstructing the view of the remote vehicle as viewed from the line of sight of the driver.

13. The method according to claim 9, wherein determining if the remote vehicle is visible to the driver includes using the information from the driver monitoring device.

14. The method according to claim 8, wherein determining the viewing location further includes:
determining that the remote vehicle is not currently visible to the driver;
determining an estimated location on the combiner where the remote vehicle may become visible to the driver at a later time as viewed from the line of sight of the driver; and
setting the estimated location to be the viewing location.

15. A method of warning a driver in a motor vehicle, comprising:
receiving information from a driver monitoring device related to the driver's point of view;
receiving information related to a remote vehicle that presents a potential hazard to the driver, wherein the information related to the remote vehicle is received from the remote vehicle via a dedicated short range communication network;
receiving information related to objects in a driving environment;
determining if the remote vehicle is visible to the driver by comparing the information related to the remote vehicle with the information related to objects in the driving environment;
determining a viewing location on a combiner in the motor vehicle that corresponds to a location on the combiner where the remote vehicle will appear at a later time as viewed from the driver's point of view by determining a trajectory of the remote vehicle based on the information received from the remote vehicle by an electronic control unit; and
forming an image onto the viewing location of the combiner in the motor vehicle.

16. The method according to claim 15, wherein the driver monitoring device is an optical device.

17. The method according to claim 15, wherein determining the viewing location includes determining a trajectory for the remote vehicle and determining the location on the combiner where the trajectory of the remote vehicle will cause the remote vehicle to become visible to the driver as viewed from the driver's point of view, using the information received from the driver monitoring device.

18. The method according to claim 15, wherein the image is a warning image that is superimposed over an object in the view of the driver.

19. The method according to claim 15, wherein the image is projected onto the combiner.

20. The method according to claim 15, wherein the information related to the remote vehicle includes at least one of position information, speed information, and heading information.

21. A method of warning a driver in a motor vehicle, comprising:
receiving information from a driver monitoring device;
receiving positional information associated with a remote vehicle, wherein the positional information is received from the remote vehicle via a vehicle communication network;
receiving identification information associated with a make and model of the remote vehicle, wherein the identification information is received from the remote vehicle via a vehicle communication network;
receiving information related to objects in a driving environment;
determining if the remote vehicle is visible to the driver by comparing the positional information associated with the remote vehicle with the information related to objects in the driving environment;
determining a viewing location on a combiner in the motor vehicle corresponding to the location on the combiner from the driver's point of view of the remote vehicle when the remote vehicle is visible to the driver based on the positional information received from the remote vehicle by an electronic control unit; and
forming an image onto the viewing location of the combiner in the motor vehicle so that the image is superimposed over the remote vehicle from the driver's point of view, wherein the image indicates a type of vehicle associated with the remote vehicle based on the identification information received from the remote vehicle.

22. The method according to claim 21, wherein the vehicle communication network is a dedicated short range communication network operating in the 5.9 GHz band with bandwidth of about 75 MHz.

23. The method according to claim 21, wherein the identification information is received directly from the remote vehicle, and the vehicle communication network comprises a signal emitted by the remote vehicle.

24. The method according to claim 21, wherein the identification information is received from the remote vehicle indirectly via the vehicle communication network that comprises one or more network nodes.

25. The method according to claim 21, wherein the image is also displayed on the combiner when the remote vehicle is not visible to the driver.

26. The method of claim 15, wherein the information is received directly from the remote vehicle, and the vehicle communication network comprises a signal emitted by the remote vehicle.

27. The method of claim 15, wherein the information is received from the remote vehicle indirectly via the vehicle communication network that comprises one or more network nodes.

* * * * *